June 9, 1964

A. E. ERLINDER ETAL 3,136,436

CONTAINER ELEVATING AND DUMPING MECHANISM FOR SELF-LOADING VEHICLE

Filed Oct. 7, 1960

INVENTORS
ATWOOD E. ERLINDER
ALBERT SHAYNE

BY *Shapiro and Shapiro*

ATTORNEYS

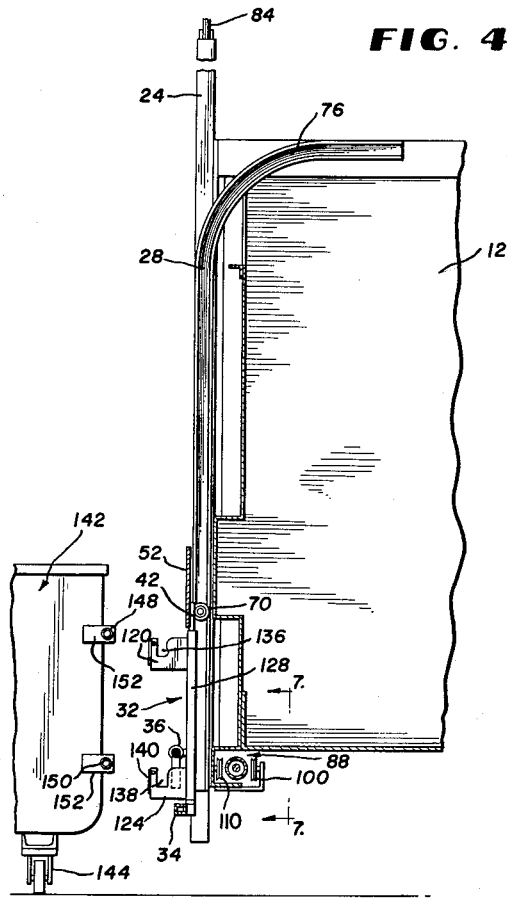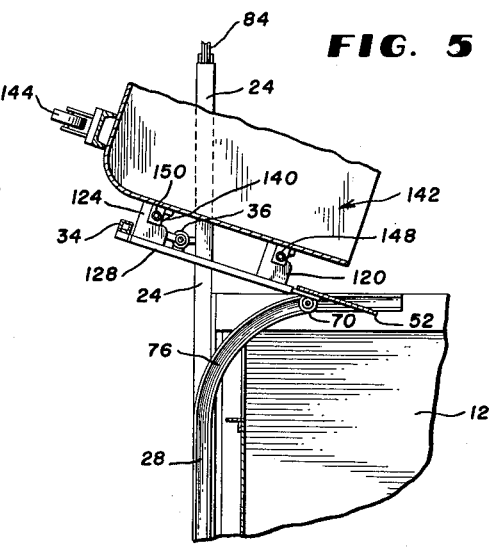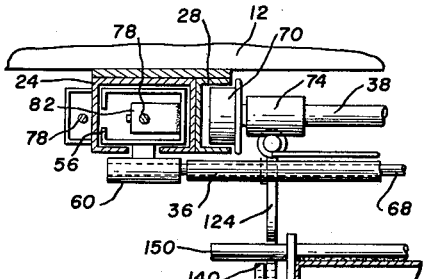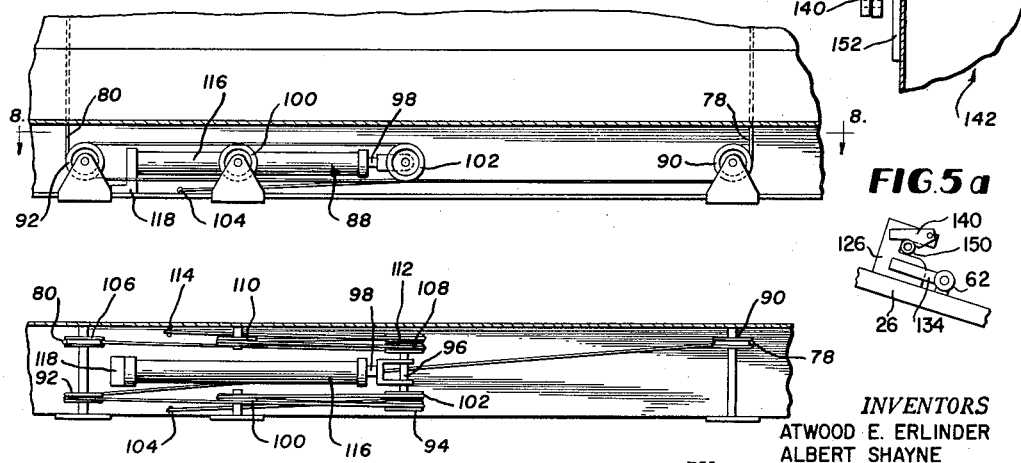
INVENTORS
ATWOOD E. ERLINDER
ALBERT SHAYNE
BY *Shapiro and Shapiro*
ATTORNEYS United States Patent Office 3,136,436
Patented June 9, 1964

3,136,436
CONTAINER ELEVATING AND DUMPING MECHANISM FOR SELF-LOADING VEHICLE
Atwood E. Erlinder, 9118 S. Loomis, Chicago, Ill., and Albert Shayne, 646 Nicholson Ave. NE., Washington, D.C.
Filed Oct. 7, 1960, Ser. No. 61,301
4 Claims. (Cl. 214—302)

This invention relates to the lifting and dumping of refuse containers, and more particularly to a self-loading vehicle incorporating apparatus for this purpose.

In the expanding trash-collection industry there is a need for an efficient, trouble-free, self-loading vehicle. Such vehicles are used to empty trash containers which remain on the premises of the trash-collection subscribers. The containers are usually provided by the trash-collection agency and are filled by the customers. Periodically a trash-collection truck is dispatched to the customer's premises, and the containers are emptied into the truck.

Business efficiency requires that a minimum of time and effort be consumed in emptying the individual containers. For this reason the trucks are provided with self-loading mechanisms which engage the containers and dump them into the truck body. In a common type of vehicle for this purpose the containers, which may be of 1, 2, or 3 cubic yard capacity for example, are rolled to the truck and are engaged by a mechanism which lifts the container and dumps it into the top of the truck body. Such trucks usually incorporate a compaction apparatus, such as a blade or piston, which is actuated to compress the rubbish within the truck body and thereby to increase the effective capacity of the truck and to reduce the number of trips which must be made to a trash dump.

With vehicles of the foregoing type, it is very important that the loading mechanism operate rapidly and reliably and with a minimum of maintenance. Prior loading mechanisms have been complex and unreliable, have required excessive maintenance, have been subject to frequent breakdowns, have been dangerous to operating personnel, and have been unduly costly to manufacture.

It is accordingly a principal object of the present invention to provide an improved apparatus which overcomes or greatly alleviates the foregoing and other deficiencies of prior comparable apparatus.

Another object of the invention is to provide a unique self-loading vehicle.

A further object of the invention is to provide an improved container lifting and dumping mechanism.

Still another object of the invention is to provide an improved container for use with such a mechanism.

An additional object of the invention is to provide an improved elevator structure.

The foregoing and other objects, advantages, and features of the invention, and the manner in which the same are accomplished, will become more readily apparent upon consideration of the following detailed description of the invention taken in conjunction with the accompanying drawings, which illustrate a preferred and exemplary form of the invention, and wherein:

FIGURE 4 is a fragmentary sectional view taken along line 4—4 of FIGURE 2;

FIGURE 5 is a fragmentary vertical sectional view illustrating the manner in which the apparatus of the invention operates to dump a container:

FIGURE 5a is a fragmentary elevation view of a detail of the invention;

FIGURE 6 is a fragmentary sectional view taken along line 6—6 of FIGURE 2;

FIGURE 7 is a fragmentary sectional view taken along line 7—7 of FIGURE 4; and

FIGURE 8 is a fragmentary sectional view taken along line 8—8 of FIGURE 7.

Briefly stated, but without limitation, the invention is concerned with a vehicle loading mechanism, which lifts and dumps an associated container. One important feature of the invention resides in an elevator having elements which engage, hold, and also lift the associated containers. Another important feature of the invention resides in a track arrangement for guiding the elevator from a bottom position, in which the elevator first engages the container, to a top position in which the container is dumped.

Figure 1:
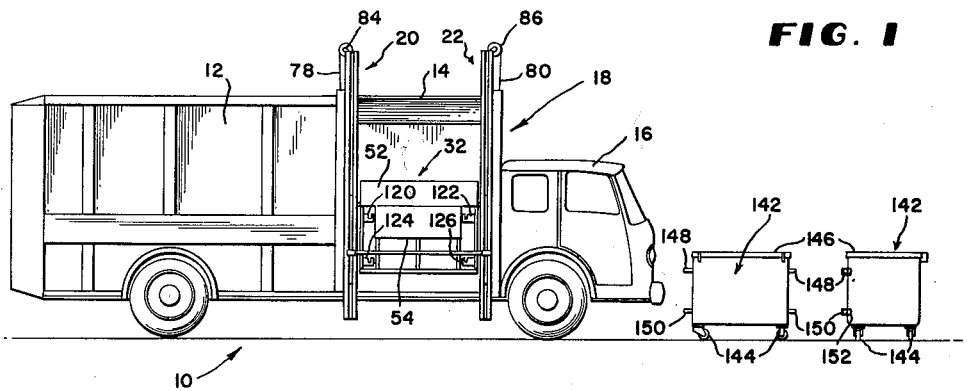
FIGURE 1 is a side elevation view of a vehicle constructed in accordance with the invention, the vehicle being illustrated together with containers constructed in accordance wih the invention.

Referring to the drawings, and initially to FIGURE 1 thereof, the invention as illustrated is applied to a truck 10 having a body 12 for receiving trash, rubbish, or other loose material. The vehicle body may be loaded through an opening 14 at its top, the opening extending from side to side of the body behind the cab 16. The remaining portion of the body top may be closed, and the rear of the truck may be provided with doors through which the trash may be unloaded at a dump. A suitable compaction mechanism (not shown) may include a piston or blade mounted transversely within the body and arranged to execute a stroke from behind the cab to the rear of the truck, thereby to compact the trash and to facilitate the unloading of the truck.

In the illustrative form of the invention the vehicle loading mechanism 18 is mounted on a side of the truck body just behind the cab 16. This mechanism comprises a pair of generally upright tracks 20 and 22 best seen in FIGURE 2. The tracks are substantially parallel and extend from a region adjacent the bottom of the truck to a region adjacent the top of the truck. Each track comprises a pair of rails, namely, an outer rail 24 or 26, and an inner rail 28 or 30. Mounted between the inner rails is an elevator 32, which is of the bottomless or planar type. As shown in FIGURES 2, 3, 4, and 6, the elevator has a generally flat framework construction comprising horizontal rods or tubes 34, 36, and 38, vertical rods or tubes 42, 44, 46, 48, and 50, and plates 52 and 54, all of which may be assembled by welding or the like.

Each of the guide rails has an associated follower connected to the elevator frame. The outer guide rails are of rectangular cross-section tubular construction and contain a rectangular cross-section follower 56 or 58 which slides along the interior of the rail. The followers 56 and 58 are attached to the elevator frame by means of journal brackets 60 and 62 having legs which extend through vertical slots 64 and 66 in the outer rails and having sleeves which may turn about a pivot rod 68 extending from the horizontal frame member 36. See FIGURES 3 and 6.

In the form shown the inner rails are of channel configuration, each inner rail having its web mounted adjacent a side of the associated outer rail, the open sides of the inner rails facing each other. The followers associated with the inner rails are rollers in the form shown, the rollers being mounted at the ends of rod 38 and journalled in sleeves such as 74 shown in FIGURES 3 and 6.

Followers 56 and 58 associated with the outer rails may be termed lower followers, and followers 70 and 72 associated with the inner rails may be termed upper followers. The outer rails 24 and 26 extend below and above the inner rails 28 and 30, the lower extension being required to accommodate the movement of the followers 56 and 58 to their lower-most position and the upper extension being required for the tilting of the elevator, as will appear more fully hereinafter. The outer rails are substantially straight, but the inner rails have curved portions, such as the portions 76 shown in FIGURES 4 and 5, which provide an excursion of the inner rails over the top of the vehicle body. The curved rail portions also take part in the tilting of the elevator.

In the preferred form of the invention a cable drive is employed to lift the elevator. This drive may comprise cables 78 and 80 which extend down the outer rails, respectively, to attachment brackets, such as 82 shown in FIGURE 6. The cables are affixed to the attachment brackets and the brackets are affixed to the followers 56 and 58. At the top of the outer rails the cables pass over pulleys 84 and 86 mounted on the rails and then extend downwardly through hollow parts of the truck body to a source of motive power, such as a hydraulic ram 88 mounted below the body as shown in FIGURES 4, 7, and 8. Cable 78 passes around a first pulley 90 and around a second pulley 92, both of which are mounted on the truck body, then around a third pulley 94 mounted on a transverse arm 96 of the piston shaft 98, around a fourth pulley 100 mounted on the vehicle body, then around a fifth pulley 102 mounted on arm 96 beside pulley 94, and finally to point 104, where the cable is fixed to the vehicle body. Similarly, cable 80 passes around a first pulley 106 mounted on the vehicle body, a second pulley 108 mounted on the piston rod arm 96, a third pulley 110 mounted on the body, and a fourth pulley 112 to point 114, where this cable is affixed to the body. The cylinder 116 of the ram is mounted on the body by a bracket 118. From FIGURES 7 and 8 it can be seen that when fluid is forced into the cylinder to move the piston rod to the right, the cables will be wound up, that is, pulled up the outer rails, the cable length being taken up by the increasing spans between the pulleys mounted on the piston rod and the pulleys mounted on the vehicle body. In the form shown there is 4-to-1 mechanical advantage. The elevator may be lowered by gravity, the weight of the elevator being sufficient to move the piston shaft to the left in FIGURES 7 and 8 when a control valve is opened to release the hydraulic fluid from the cylinder 116. The fluid is contained within a conventional hydraulic system including a pump, a reservoir, the ram, and the control valve.

Figure 2:
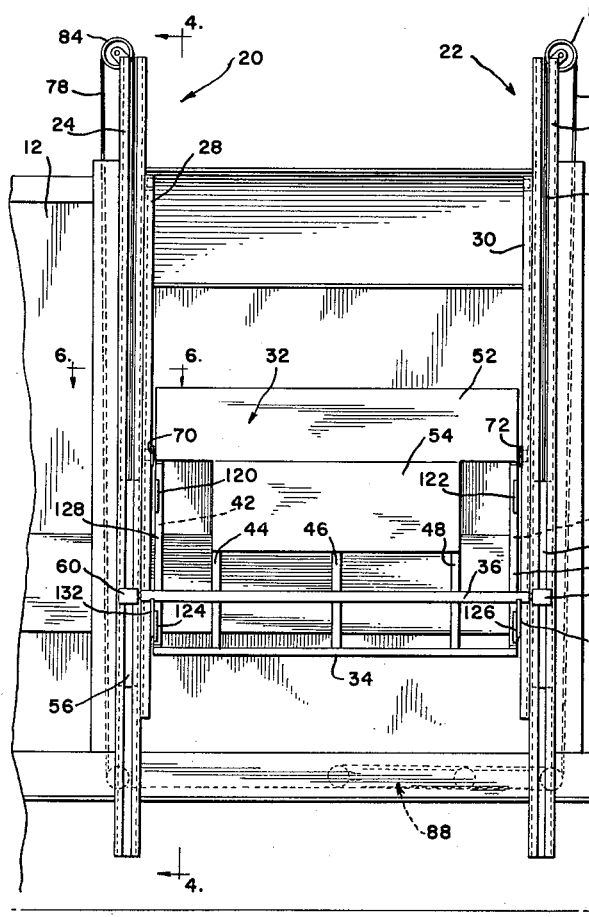
FIGURE 2 is an enlarged side elevation view illustrating the vehicle loading mechanism.
Figure 3:
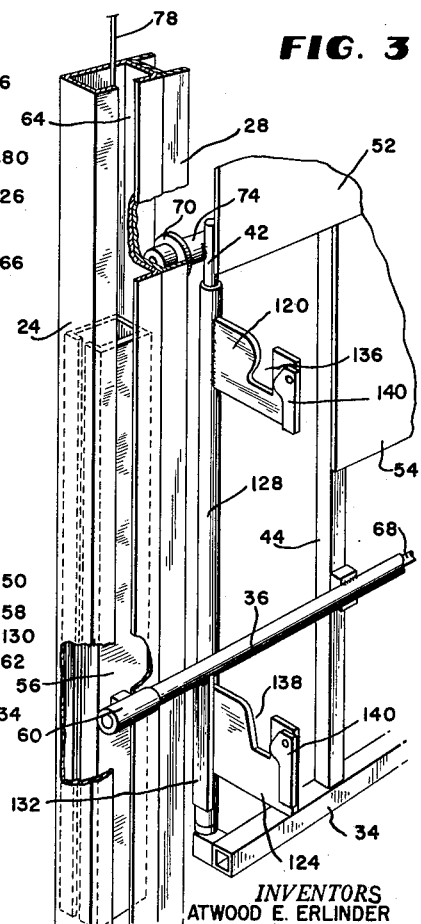
FIGURE 3 is a fragmentary perspective view, partly in section, illustrating details of the invention.

To hold and lift a container the elevator is provided with container-engaging elements 120, 122, 124, and 126. In the form shown these elements are hook-like, being arranged in an upper pair and a lower pair. Hooks 120 and 124 are mounted on a common vertical sleeve 128, and in a like manner hooks 122 and 126 are mounted on a vertical sleeve 130. The sleeves may be turned about the vertical frame rods 42 and 50 to permit the hooks to be moved from an inactive position substantially parallel to the truck body as shown in FIGURE 1 to an active position substantially perpendicular to the truck body as shown in FIGURES 2, 3, and 4. Such movement of the hooks is provided to minimize projections from the truck body when the truck is in motion, but the hooks may be fixed in their active position if such projections are not objectable. Stops 132 and 134 depending from the horizontal sleeve 36 of the elevator frame may be employed to insure that the hooks are placed in their proper active position.

The hooks may be formed by cutting upwardly open tapered slots in suitable plate members. The slots 136 of the upper hooks are undercut toward the truck body at the bottom of the slots. The slots 138 of the lower hooks may also be undercut if desired. The hooks are preferably provided with gravity locks 140. Such locks may assume the form of inverted L-shaped, freely pivoting, depending links. Each link has an enlargement pivoted on the hook at the side of the slot remote from the vehicle body, and each link has a depending elongated leg. When the elevator is vertical, the links hang down along the slots as shown in FIGURE 3, but when the elevator is tilted, the center of gravity of the links is such as to cause the enlargements to protrude beyond the adjacent slot wall.

The containers to be lifted and dumped are designated 142 in the drawings. Such containers may be of generally rectangular configuration, being mounted on pairs of rollers or casters 144, at least one pair of which may be swivelled. A cover 146 may be hinged at the top of the container along the edge which will be remote from the elevator when the container is engaged. Each container is provided with lifter elements which cooperate with the associated lifter elements of the elevator. In the form shown the lifter elements of the containers comprise parallel, horizontal bars or pipes 148 which extend across the side of the container which will be adjacent the elevator, and extend beyond the ends of the container, the ends of the bars constituting projecting ears. As indicated in FIGURE 6, the bars may be welded to the container wall, the attachment being further strengthened by brackets 152 which extend from the container ends. Each container thus has a pair of projecting upper ears and a pair of projecting lower ears. The upper ears engage the upper hooks 120 and 122 of the elevator, and the lower ears engage the lower hooks 124 and 126.

In the use of the apparatus of the invention, the truck drives to the customer's premises, parking as close as possible to the containers 142, into which the customer has placed trash or other material. Each container is then rolled to the side of the truck and is positioned so that the upper ears overlie the upper hooks and the lower ears overlie the lower hooks. The control valve of the hydraulic system is then actuated to lift the elevator. When the elevator has moved upwardly a small distance, the ears of the container will enter the slots of the associated hooks. As the elevator continues to rise, the container is lifted off the ground by the hooks, also being held on the elevator by these elements, there being no elevator bottom or additional retaining elements.

As the elevator approaches the top of the tracks, the upper followers 70 and 72 move around the curved portions 76 of the inner rails, causing the elevator to tilt, the pivotal movement being accommodated by the journals 60 of the lower followers. The rails may be mounted far enough from the truck body wall between the rails and the truck body may be cut back enough to prevent contact of the elevator with the body. Continued movement of the elevator will raise the lower followers above the upper followers, thereby inverting the elevator and the container as shown in FIGURE 5. The inversion may be continued until the vertical axis of the container is at about 45° to the vertical. The container top may be permitted to flop open or may be opened before lifting. During the inversion of the container the upper followers tend to move back along the inner rails somewhat, but the tilting of the elevator may be limited by stops near the top of rails 24 and 26 which engage followers 56 and 58. The container is prevented from falling off the elevator during dumping by the undercut portions of the slots 136 of the upper hooks, into which ears 150 are moved by gravity, and by the gravity locks 140, which block the slots as shown in FIGURE 5a, when the elevator tilts.

When the container has been dumped, the control valve of the hydraulic system may be moved to its "down" position, and the elevator will move down its tracks under the influence of gravity. When the elevator approaches the bottom of its travel, the lifting ears of the container are released from the hooks. The container may be returned to its place on the customer's premises. The remaining containers are lifted and dumped in the same manner.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

The invention claimed is:

1. In combination with a truck body having an elevated access opening, container lifting and emptying apparatus comprising a pair of spaced tracks each having an inner rail and an outer rail in side-by-side alignment along the direction between said tracks, all of said rails extending upwardly for a major portion of their length in substantially the same plane exteriorly adjacent a wall of said body, said inner rails having upper terminating portions which curve interiorly of said body adjacent said access opening and being substantially straight below said terminating portions, said outer rails being substantially straight and having upper terminating portions extending upwardly beyond said inner rails, an elevator having a pair of upper followers engaging said inner rails, respectively, and a pair of lower followers engaging said outer rails, respectively, means for moving said elevator along said tracks, and means on said elevator for supporting a container exteriorly adjacent said body wall and holding said container during movement of said elevator between a lower position, at which said container is upright, and an upper position, at which said followers engage the respective terminating portions of said rails and said container is inverted.

2. The combination of claim 1, said elevator being planar, said container supporting means comprising an upper pair of upwardly open hooks and a lower pair of upwardly open hooks projecting exteriorly of said elevator.

3. The combination of claim 2, further comprising a container having at one side thereof four bar members, said bar members being positioned to be received within corresponding hooks.

4. The combination of claim 1, said elevator moving means comprising cables passing down said outer rails and affixed to said lower followers, respectively, and means for winding up said cables.

References Cited in the file of this patent

UNITED STATES PATENTS

| | | |
|---|---|---|
| 1,492,675 | Clark et al. | May 6, 1924 |
| 1,763,560 | Amendolara | June 10, 1930 |
| 1,768,149 | Remde | June 24, 1930 |
| 1,789,050 | Ochsner | Jan. 13, 1931 |
| 2,592,324 | Oliver | Apr. 8, 1952 |
| 2,606,680 | Herman | Aug. 12, 1952 |
| 2,647,651 | Vincent | Aug. 4, 1953 |
| 2,702,142 | Jones | Feb. 15, 1955 |
| 2,885,101 | Aldredge et al. | May 5, 1959 |
| 2,908,410 | Glanz | Oct. 13, 1959 |
| 2,951,602 | Walden et al. | Sept. 6, 1960 |
| 3,032,216 | McCarthy | May 1, 1962 |
| 3,040,919 | Nolan | June 26, 1962 |
| 3,063,586 | Appleman | Nov. 13, 1962 |

FOREIGN PATENTS

| | | |
|---|---|---|
| 479,462 | Germany | July 18, 1929 |